United States Patent
Fayeulle et al.

(10) Patent No.: US 6,855,282 B2
(45) Date of Patent: Feb. 15, 2005

(54) METHOD OF FABRICATING A LUBRICANT-INTEGRATED LOAD/UNLOAD RAMP FOR A DISC DRIVE

(75) Inventors: Serge Jacques Fayeulle, Longmont, CO (US); Robert Allen Alt, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 425 days.

(21) Appl. No.: 09/777,269

(22) Filed: Feb. 5, 2001

(65) Prior Publication Data

US 2001/0045681 A1 Nov. 29, 2001

Related U.S. Application Data

(60) Provisional application No. 60/183,099, filed on Feb. 17, 2000.

(51) Int. Cl.$^7$ .............................................. B29C 45/16
(52) U.S. Cl. ............. 264/241; 264/328.14; 264/328.18; 264/328.17; 264/328.1
(58) Field of Search ........................ 264/328.1, 328.17, 264/331.14, 328.18, 241

(56) References Cited

U.S. PATENT DOCUMENTS

| | | | |
|---|---|---|---|
| 4,217,324 A | 8/1980 | Meek | 264/236 |
| 4,557,885 A | 12/1985 | Kiess et al. | 264/105 |
| 4,686,592 A | 8/1987 | Carroll et al. | 360/97 |
| 5,585,980 A | 12/1996 | Boutaghou | 360/105 |
| 5,644,451 A | 7/1997 | Chan et al. | 360/105 |
| 5,812,347 A | 9/1998 | Henke | 360/106 |
| 5,870,255 A | 2/1999 | Hornung et al. | 360/105 |
| 5,995,326 A | 11/1999 | Thayne et al. | 360/104 |
| 6,078,474 A * | 6/2000 | Koyanagi et al. | 360/254.8 |
| 6,487,051 B1 * | 11/2002 | Koyanagi et al. | 360/254.8 |

* cited by examiner

Primary Examiner—Edmund H. Lee
(74) Attorney, Agent, or Firm—Fish & Richardson P.C., P.A.

(57) ABSTRACT

A method for fabricating a disc drive load/unload ramp incorporates a disc drive compatible lubricant as the mold releasing agent. A mold having a load/unload ramp cavity is sprayed with a predetermined amount of disc drive compatible lubricant so that the finished load/unload ramp exhibits a predetermined thickness of lubricant. Alternatively, a known amount of disc drive compatible lubricant is combined with the load/unload ramp polymer during the melting stage of the molding process to yield a load/unload ramp exhibiting a predetermined thickness of lubricant. In either case, the lubrication of the load/unload ramp is integrated into the fabrication process in order to obtain a one step finished pre-lubricated product.

7 Claims, 5 Drawing Sheets

METHOD OF FABRICATING A LUBRICANT-INTEGRATED LOAD/UNLOAD RAMP FOR A DISC DRIVE

RELATED APPLICATIONS

This application claims priority of PCT application, filed on Feb. 5, 2001 and U.S. provisional application Ser. No. 60/183,099, filed Feb. 17, 2000.

FIELD OF THE INVENTION

This application relates generally to magnetic disc drives and more particularly to a method of fabricating a lubricated load/unload ramp for use in a disc drive.

BACKGROUND OF THE INVENTION

Disc drives are data storage devices that store digital data in magnetic form on a rotating storage medium on an information storage disc. Modern disc drives comprise one or more rigid information storage discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads in an arc across the surface of the discs. Each of the concentric tracks is generally divided into a plurality of separately addressable data sectors. The recording transducer, e.g. a magnetoresistive read/write head, is used to transfer data between a desired track and an external environment. During a write operation, data is written onto the disc track and during a read operation the head senses the data previously written on the disc track and transfers the information to a host computing system. The overall capacity of the disc drive to store information is dependent upon the disc drive recording density.

The transducers are mounted on sliders or heads via flexures at the ends of a plurality of actuator arms that project radially outward from the actuator body. The actuator body pivots about a shaft mounted to the disc drive housing at a position closely adjacent the outer extreme of the discs. The pivot shaft is parallel with the axis of rotation of the spindle motor and the discs, so that the transducers move in a plane parallel with the surfaces of the discs.

Typically, such rotary actuators employ a voice coil motor to position the transducers with respect to the disc surfaces. The actuator voice coil motor includes a coil mounted on the side of the actuator body opposite the transducer arms so as to be immersed in the magnetic field of a magnetic circuit comprising one or more permanent magnets and magnetically permeable pole pieces. When controlled direct current (DC) is passed through the coil, an electromagnetic field is set up which interacts with the magnetic field of the magnetic circuit to cause the coil to move in accordance with the well-known Lorentz relationship. As the coil moves, the actuator body pivots about the pivot shaft and the transducers move across the disc surfaces. The actuator thus allows the transducer to move back and forth in an accurate fashion between an inner radius and an outer radius of the discs.

When a stop-start contact disc drive is de-energized, the transducers are automatically moved to a storage location or "park" location on the disc surfaces. The park location is typically adjacent and outside the inner or outer periphery of the data storage region of the disc and is typically called a landing zone. This landing zone typically does not contain any useable data as the transducer physically contacts the disc at rest. Consequently, any data stored in this area would likely be lost or compromised. In addition, the landing zone is typically roughened to minimize the stiction of the transducer against the disc surface.

Alternatively, disc drives may utilize load/unload ramps to facilitate removal of the transducers from the discs to a parked position adjacent the discs. The load/unload ramps in a disc drive are typically stationary, such that in the process of the suspension assemblies being unloaded from the disc, the transducers are moved to the outer rim portion of the discs and onto ramps which extend over the outer rim portions of the disc. The transducers then traverse up the load/unload ramps to a park location off of the disc surfaces. In the reverse process, the transducers are loaded onto the disc by the transducers moving down the stationary ramps onto the media.

The use of a load/unload ramp to store the transducer under de-energized conditions has several advantages over the use of the traditional landing zone on the disc surface. First, using a load/unload ramp eliminates stiction concerns and friction failures associated with the transducer being de-energized on the landing zone of the disc. Second, information storage disc have a protective carbon overcoat which is at least in part required to support the transducer-landing zone interaction. In the absence of this interaction, a thinner carbon overcoat may be utilized on the disc surface. A thinner carbon overcoat on the information storage disc allows for the design of decreased transducer-to-disc media spacing and for corresponding increased recording density. Finally, by parking the transducer head off the information storage disc surface on the load/unload ramp, a larger amount of disc space is available for data storage, which results in increased recording density.

However, the use of a load/unload ramp in a disc drive has several disadvantages, one of which is that the numerous interactions between the load/unload ramp and transducer/suspension assembly presents a tribological problem involving friction, lubrication and wear on the surfaces of both the load/unload ramp and transducer/suspension assembly. Ultimately, the level of friction between the surfaces of the load/unload ramp and transducer/suspension assembly determines the wear on those surfaces and ultimately to the formation of debris off of those surfaces and into the disc drive. Debris formation inside the disc drive is a major concern in the disc drive industry. Thus, minimizing friction between the load/unload ramp and the transducer/suspension assembly is a major concern in the disc drive art.

Presently, friction between the load/unload ramp and transducer/suspension assembly is minimized by forming the ramp out of a low friction-low wear plastic and by lubricating the transducer/suspension assembly or more preferably the load/unload ramp with a Teflon™ based lubricant. However, administering the proper amount of lubricant on the load ramp surfaces and of manufacturing a cost effective load/unload ramp with a lubricant film continues to present shortcomings in disc drive art. Against this backdrop the present invention has been developed.

SUMMARY OF THE INVENTION

In accordance with the present invention the above problems and others have been solved by molding a load/unload ramp using a disc drive compatible lubricant as the mold releasing agent.

One embodiment of the present invention is a method for fabricating a load/unload ramp for a disc drive. The method includes providing a mold having a cavity shaped for forming a load/unload ramp and coating surfaces of the cavity with an amount of a disc drive compatible lubricant. The disc drive compatible lubricant acts as a releasing agent and is effective at providing a layer of lubricant at a predetermined thickness on the fabricated load/unload ramp. The method further includes injecting a polymer melt into the lubricant coated cavity, solidifying the polymer melt to form the molded load/unload ramp in the cavity, and releasing the molded load/unload ramp from the cavity.

Another embodiment of the present invention is an alternative method for fabricating a load/unload ramp for a disc drive. The method includes providing a mold having a load/unload ramp shaped cavity, plasticizing a polymer to form a polymer melt, and mixing the polymer melt with a disc drive compatible lubricant. The disc drive compatible lubricant is used as a releasing agent and is effective in providing a layer of lubricant a predetermined thickness on the fabricated load/unload ramp. The method further includes injecting the mix into the mold cavity and allowing it to solidify in the cavity. Finally, the fabricated load/unload ramp is released from the mold cavity.

These and various other features as well as advantages which characterize the present invention will be apparent from a reading of the following detailed description and a review of the associated drawings.

DETAILED DESCRIPTION

Figure 1:
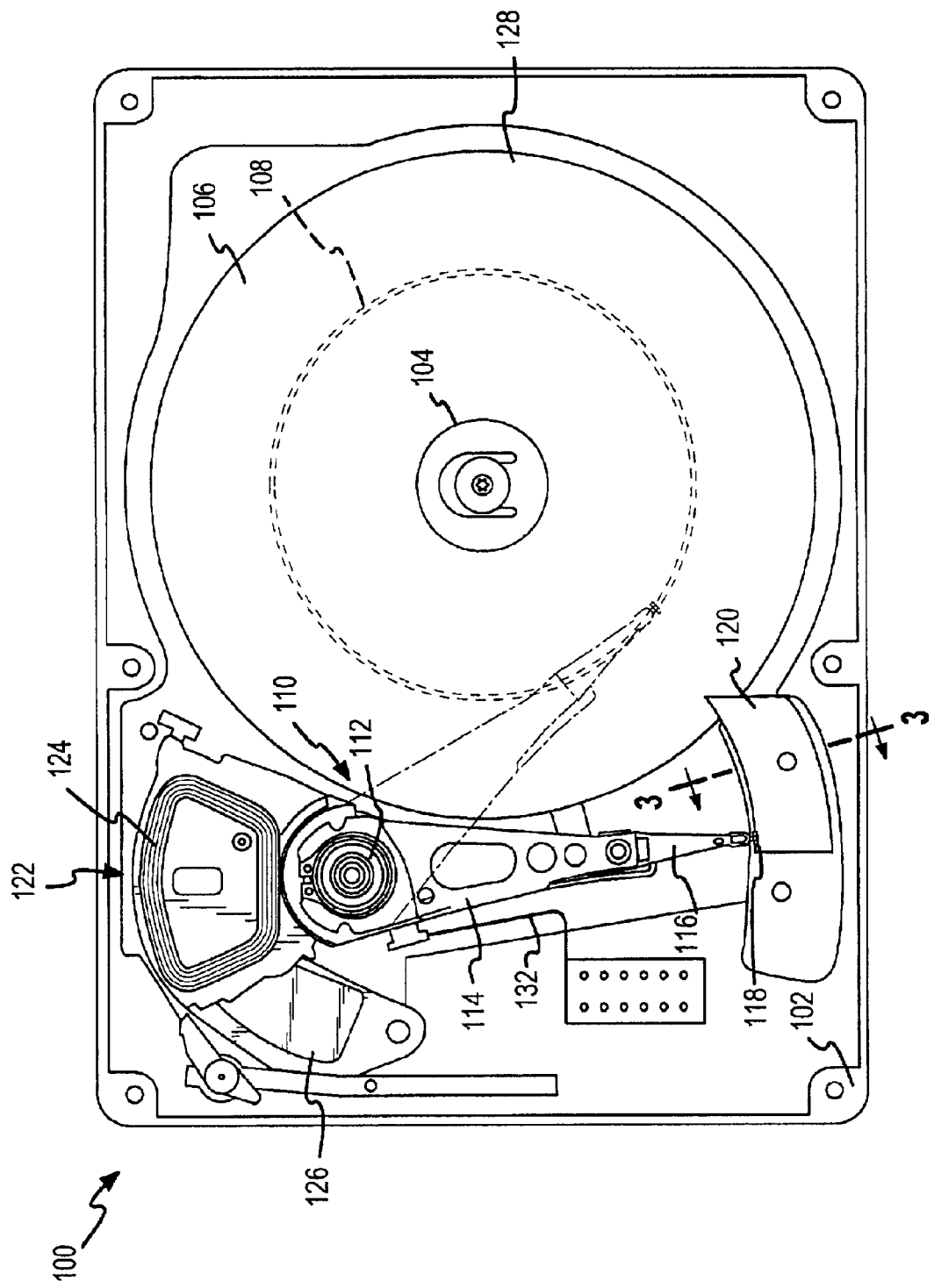
FIG. 1 is a plan view of a disc drive incorporating a preferred embodiment of the present invention showing the primary internal components.

A disc drive 100 constructed in accordance with a preferred embodiment of the present invention is shown in FIG. 1. The disc drive 100 includes a base 102 to which various components of the disc drive 100 are mounted. A top cover (not shown) cooperates with the base 102 to form an internal, sealed environment for the disc drive in a conventional manner. The components include a spindle motor 104 which rotates one or more discs 106 at a constant high speed. Information is written to and read from tracks 108 on the discs 106 through the use of an actuator assembly 110, which rotates during a seek operation about a bearing shaft assembly 112 positioned adjacent the discs 106. The actuator assembly 110 includes a plurality of actuator arms 114 which extend towards the discs 106, with one or more flexures 116 extending from each of the actuator arms 114. Mounted at the distal end of each of the flexures 116 is a head 118 which includes an air bearing slider (not shown) enabling the head 118 to fly in close proximity above the corresponding surface of the associated disc 106. Additionally, extending substantially laterally from the distal end of the flexure 116 is a lift tab (not shown) for engagement with a load/unload ramp 120 as is described in greater detail below.

During a seek operation, the track position of the heads 118 is controlled through the use of a voice coil motor (VCM) 122, which typically includes a coil 124 attached to the actuator assembly 110, as well as one or more permanent magnets 126 which establish a magnetic field in which the coil 124 is immersed. The controlled application of current to the coil 124 causes magnetic interaction between the permanent magnets 126 and the coil 124 so that the coil 124 moves in accordance with the well known Lorentz relationship. As the coil 124 moves, the actuator assembly 110 pivots about the bearing shaft assembly 112, and the heads 118 are caused to move across the surfaces of the discs 106.

The spindle motor 104 is typically de-energized when the disc drive 100 is not in use for extended periods of time. The heads 118 are moved over the surfaces of the discs 106 to the load/unload ramp 120 located adjacent the outer periphery 128 of the information storage discs 106. The heads 118 traverse onto the load/unload ramp 120 and are secured in position through the use of an actuator latch arrangement (not shown), which prevents inadvertent rotation of the actuator assembly 110 when the heads 118 are parked on the load/unload ramps 120.

A flex assembly 132 provides the requisite electrical connection paths for the actuator assembly 110 while allowing pivotal movement of the actuator assembly 110 during operation. The flex assembly 132 includes a printed circuit board (not shown) to which head wires (not shown) are connected; the head wires being routed along the actuator arms 114 and the flexures 116 to the heads 118. The printed circuit board 134 typically includes circuitry for controlling the write currents applied to the heads 118 during a write operation and a preamplifier for amplifying read signals generated by the heads 118 during a read operation. The flex assembly terminates at a flex bracket (not shown) for communication through the base deck 102 to a disc drive printed circuit board (not shown) mounted to the bottom side of the disc drive 100.

As briefly discussed above, the disc drive 100 has a load/unload ramp 120 in accordance with a preferred embodiment of the present invention for securing a head 118 off the disc 106 during a shutdown or standby condition. Because the actuator assembly 110 moves back and forth in an arcuate fashion between an inner radius and an outer radius of the disc 106, the load/unload ramp 120 has a generally arcuare shape that aligns and lays in the path of the movement of the distal tip of the actuator assembly 110 when the actuator arm 114 swings to the outer diameter 128 of the disc 106.

Figure 2:
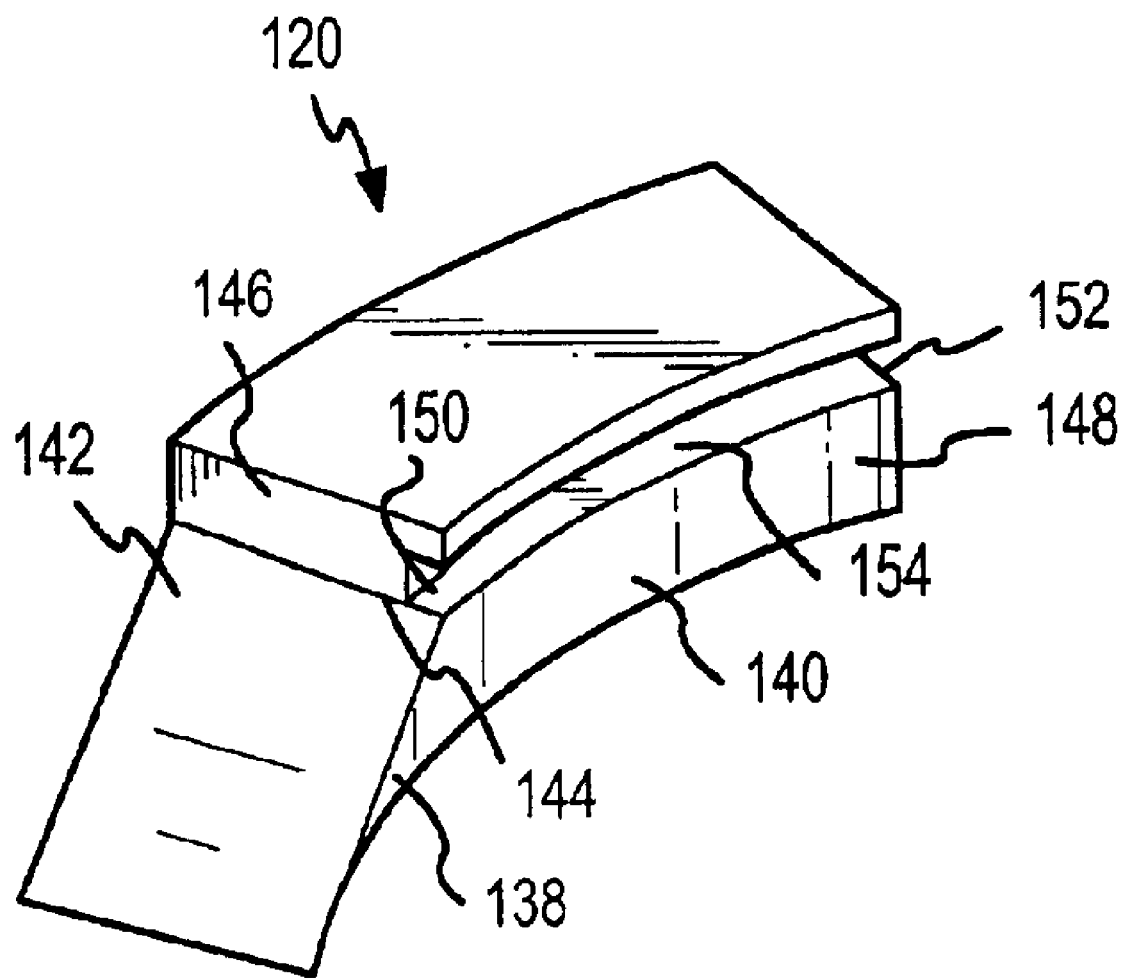
FIG. 2 is an exploded perspective view of a load/unload ramp in accordance with a preferred embodiment of the present invention.

FIG. 2 is a perspective view of the load/unload ramp 120. The load/unload ramp 120 is typically secured to the base plate 102 adjacent the outer periphery 128 of the information storage disc 106 so that the load/unload ramp 120 does not interfere with the operation of the head 118. The structure of the load/unload ramp 120 includes a pick-up portion 138, adjacent the outer diameter 128 of the information storage disc 106, and a storage portion 140 that extends away from the information storage disc 106. The pick-up portion 138 forms a generally curved wedge like structure having an inclined surface 142 for sliding engagement typically with a lift tab (not shown) of the flexure 116.

Extending distally away from the pick-up portion 138 of the load/unload ramp 120 is a generally flat storage portion 140 of the load/unload ramp 120. In general, the storage portion 140 of the load/unload ramp 120 is a solid body having a side surface that is curved complementary with the arcuate movement of the actuator assembly 110. The storage portion 140 extends in a vertical direction slightly above and adjacent the top end 144 of the inclined surface 142 to form a wall or face 146. A horizontal groove or slot 150 is formed in one side 148 of the storage portion 140 that extends from the wall 146, along the length of the storage portion 140, to the distal end 152 of the storage portion 140. The bottom surface 154 of the groove 150 is substantially parallel to the plane or rotation of the actuator and aligns with the top end 144 of the ramp face 142 of the pick-up portion 138. The depth and height of the groove 150 is generally uniform and should preferably be sufficient for the acceptance of the flexure lift tab (not shown) so that when the actuator is rotated away from the disc 106, the flexure left tab rides up the inclined surface 142 directly into and along the groove 150. The groove 150 functions to support the lift tab and prohibit vertical movement of the lift tab by confining the lift tab in the groove during a shock event or during normal disc drive shut down and standby conditions.

It should be noted that embodiments of the present invention are not limited to load/unload ramps designed to secure actuator assemblies on only one side of an information storage disc. Embodiments of the present invention can function when the load/unload ramp is configured to secure two actuator assemblies, one assembly operating on the top side of an information storage disc and a second actuator assembly operating on the bottom side of the same information storage disc (see FIG. 3). As such, the above description of the load/unload ramp structure is for illustrative purposes only. Any load/unload ramp structure that interacts with the actuator assembly to remove the head from the information storage disc surface is within the scope of the present invention as the inventive features of embodiments of the present invention address structurally independent features of the load/unload ramp.

Figure 3:
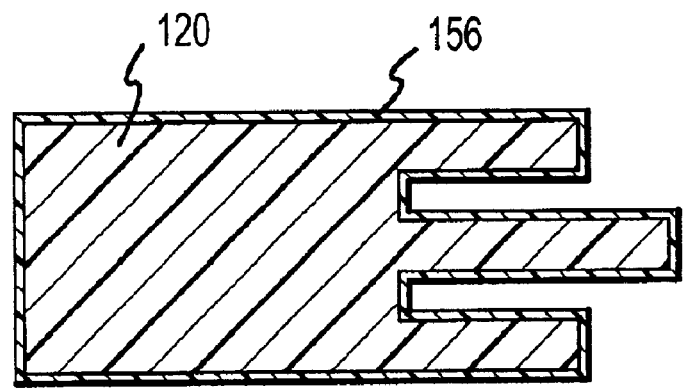
FIG. 3 is a representative cross section through a load/unload ramp in accordance with a preferred embodiment of the present invention.

A cross section of the load/unload ramp 120 that lifts the heads 118 from the top and bottom sides of a disc 106 taken along the line 3—3 of FIG. 1 is shown in FIG. 3. The load/unload ramp 120 is preferably composed of any disc drive compatible polymer. Typical polymers for use with embodiments of the present invention are low friction-low wear plastics. Low friction-low wear plastics include, but are not limited to, members of the Liquid Crystal Polymer family, such as Vectra A430 (manufactured by Ticona), etc.

A thin layer 156 of lubricant coats the load/unload ramp 120 to minimize the friction coefficient between the lift tab and the polymer surface of the load/unload ramp. Friction coefficients below 0.2 and preferably below 0.15 are required for optimal lift tab-load/unload ramp interactions. Lubricants for use with embodiments of the present invention must be compatible with the disc drive 100 and can include, but are not limited to, perfluoropolyether, derivatives of perfluoropolyether, 2-Tetraol, 2-Dol, etc.

Figure 4:
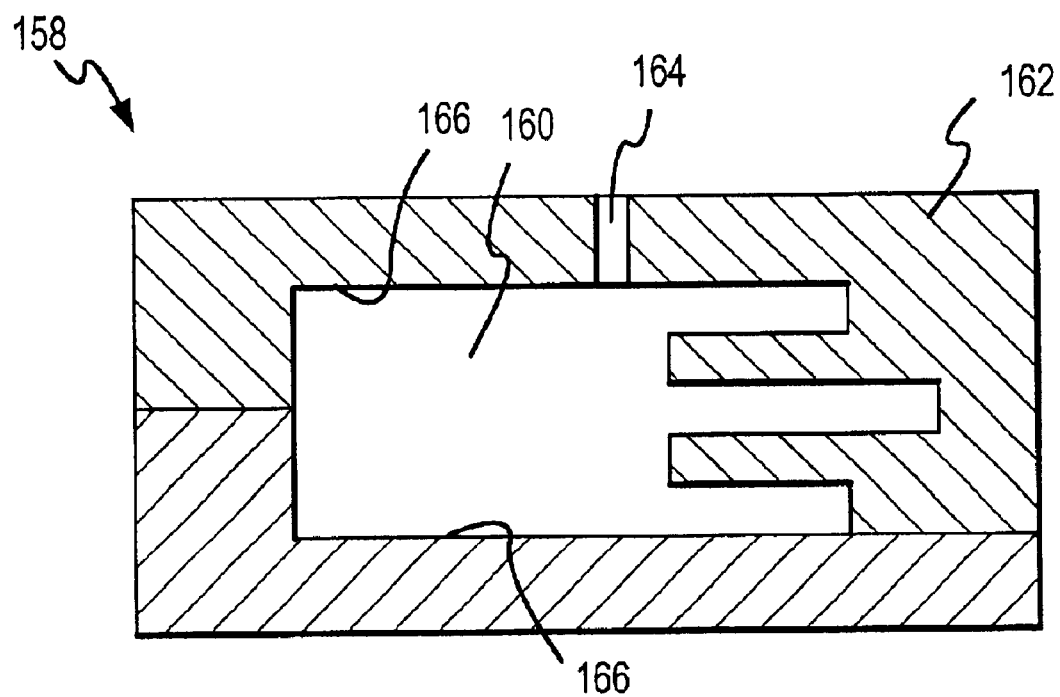
FIG. 4 is a representative cross section through a load/unload ramp mold in accordance with a preferred embodiment of the present invention.

The method of fabricating the load/unload ramp 120 involves the use of a disc drive 100 compatible lubricant, like perfluoropolyether, as a mold release agent during a molding process of the load/unload ramp. A load/unload ramp mold 158 is shown in FIG. 4. The mold 158 has a load/unload ramp shaped cavity 160 and surrounding surfaces 162 for withstanding the temperatures and pressures required to form the resultant load/unload ramp 120. Additionally, an opening in the mold provides the injection gate 164 for the mold cavity 160.

At the beginning of each molding cycle a controlled amount of disc compatible lubricant is applied to the mold cavity 160 in which the load/unload ramp 120 is formed. The thickness of the lubricant layer on the finished load/unload ramp 120 is dependent on the amount of lubricant inserted into the mold cavity 160. Typically, the thickness of the lubricant layer on the resulting load/unload ramp 120 needs to be between about 200 Å and about 500 Å, and preferably between about 200 Å and about 350 Å, and most preferably between about 200 Å and about 250 Å. Lubricant layers thicker than about 550 Å tend to lead to the formation of lubricant droplets that can contaminate the disc drive 100. Alternatively, a lubricant layer that is less than about 150 Å tends not to provide adequate lubricant properties to the surface of the load/unload ramp 120. Application of the lubricant to the mold cavity 160 prior to melt injection of the load/unload ramp polymer is preferably done by spraying the lubricant onto the inside mold cavity surfaces 166, although any standard technique for applying a releasing agent to a mold cavity wall may be used.

The low friction-low wear polymer, i.e., liquid crystal polymer, is heated to a temperature of approximately 290° C. to form a substantially homogenous polymer melt material. Plasticized polymer melt material is injected through the gate 164 into a pre-lubricated cavity 160 having a controlled or known amount of disc drive compatible lubricant applied to the cavity surfaces 166. The polymer melt is injected under pressure until the mold cavity 160 is filled. The polymer melt is then allowed to polymerize and cool. The rate of cooling may be accelerated or controlled as is well known within the art. Once the load/unload ramp material is cooled and solidified in the mold 158 it is removed from the mold cavity 160 using the disc drive compatible lubricant as the releasing agent.

Alternatively, it is envisioned that a similar lubricant layer and lubricant layer thickness can be obtained on the finalized load/unload ramp surfaces by blending or mixing the disc drive compatible lubricant and load/unload ramp polymer melt during the melt preparation stage of the molding process. In this case, the process described above would be similar except that the load/unload ramp material and controlled amount of disc drive compatible lubricant would be pre-mixed in a plasticized form and then injected under pressure into an un-lubricated or minimally lubricated load/unload ramp mold cavity. The load/unload ramps 120 formed in this fashion advantageously have lubricant dispersed throughout the resulting load/unload polymer. The lubricant constituent of the melt may be approximately 0.5 to 3%, although other lubricant concentrations are envisioned to be within the present invention.

It can be appreciated that other constituents may be added to the polymer or polymer/lubricant mix, to form a load/unload ramp composition having modified characteristics. An example of one such constituent is a load/unload ramp polymer/lubricant composition containing a surfactant for facilitating the uniformity at which the lubricant is disposed within the polymer.

Figure 5:
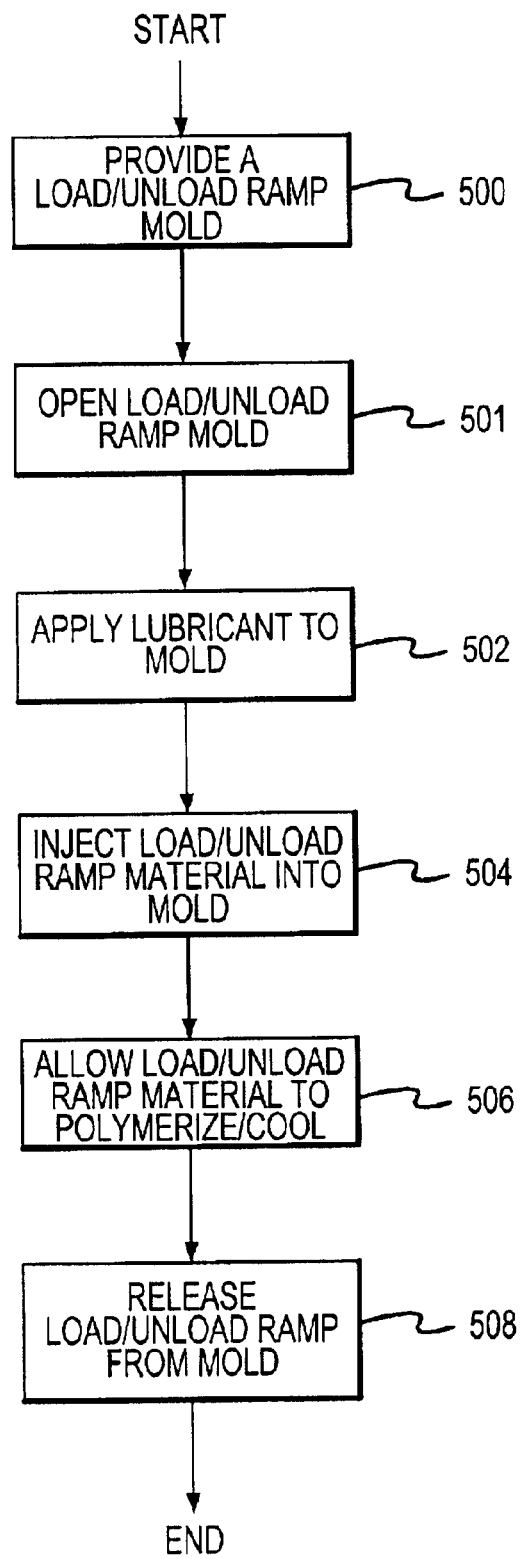
FIG. 5 is a flow chart of the method of fabricating a load/unload ramp in accordance with a preferred embodiment of the present invention.

One method for fabricating a load/unload ramp 120 in conformity with the present invention is shown in FIG. 5. In operation 500, a load/unload ramp mold is provided. Process control transfers to Operation 501. In Operation 501, the load/unload ramp mold is opened. Process control then transfers to Operation 502. In Operation 502, a controlled amount of disc compatible lubricant is applied to the load/unload ramp mold cavity surfaces. Process control then transfers to Operation 504. In Operation 504, the load/unload ramp polymer is heated and injected or poured into the load/unload ramp cavity. Process control then transfers to Operation 506. In Operation 506, the load/unload ramp material is allowed to polymerize and cool. Process control then transfers to Operation 508. In Operation 508, the molded load/unload ramp is released from the mold using the disc drive compatible lubricant as the mold releasing agent.

Figure 6:
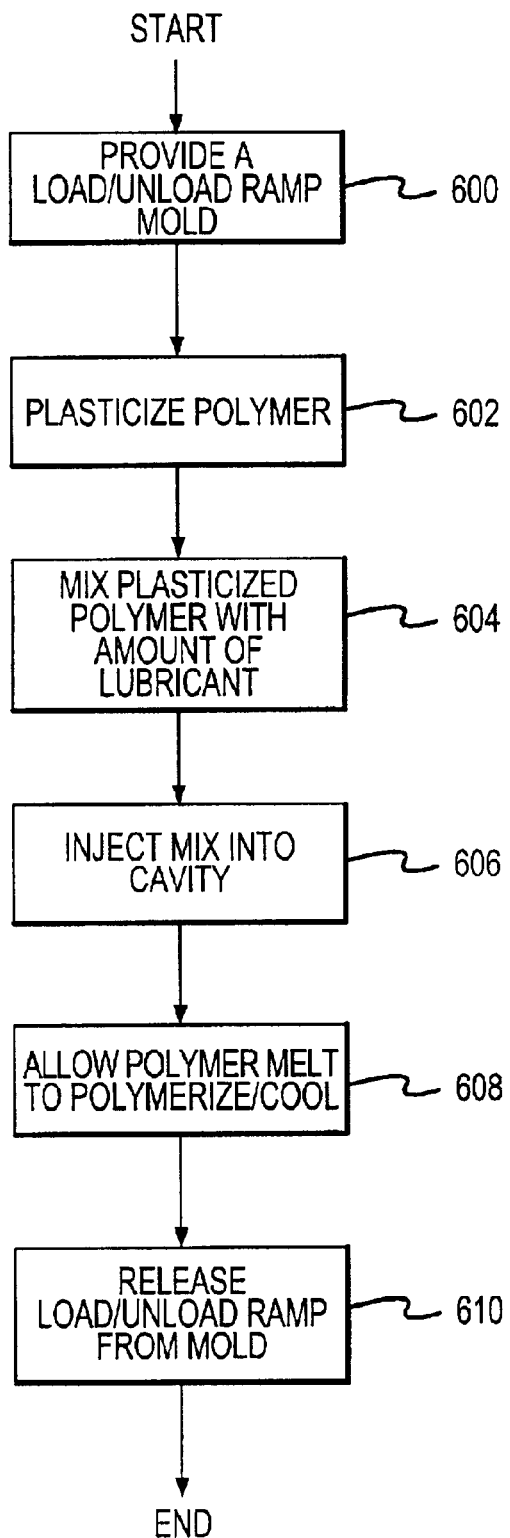
FIG. 6 is a flow chart of the method of fabricating a load/unload ramp in accordance with a second preferred embodiment of the present invention.

Another method for fabricating the load/unload ramp in conformity with the present invention is shown in FIG. 6. In Operation 600, a load/unload ramp mold is provided. Process control transfers to Operation 602. In Operation 602, the polymer used to form the load/unload ramp is plasticized, forming a polymer melt. Process control transfers to Operation 604. In Operation 604, the polymer melt is mixed with a disc drive compatible lubricant that acts as a releasing agent and is effective in providing a layer of predetermined thickness on the fabricated load/unload ramp. Process control transfers to Operation 606. In Operation 606, the polymer melt—lubricant mix is injected into the mold cavity. Process control then transfers to Operation 608. In Operation 608, the mix is allowed to solidify and form the molded load/unload ramp in the cavity. Process control then transfers to Operation 610. In Operation 610, the molded or fabricated load/unload ramp is released from the cavity.

In summary, a preferred embodiment of the invention described herein is directed to a method for fabricating a load/unload ramp (such as 120) for a disc drive (such as 100). The method includes providing a mold (such as 158) having a cavity (such as 160) therein shaped for forming a load/unload ramp (such as 120) (such as in step 500). Next, surfaces (such as 166) in the cavity (such as 160) are coated with an amount of a disc drive compatible lubricant that acts as a releasing agent effective to provide a layer (such as 156) of predetermined thickness on the fabricated load/unload ramp (such as in step 502). A polymer melt is injected into the lubricant coated cavity (such as 160) (such as in step 504). The polymer melt is solidified to form the molded load/unload ramp (such as 120) in the cavity (such as 160) (such as in step 506). Finally, the molded load/unload ramp (such as 120) is released from the cavity (such as 160) (such as in step 508).

In another preferred embodiment of the invention, the method further includes selecting the disc drive compatible lubricant from the perfluoropolyether family.

In another preferred embodiment of the invention, the method further includes using an amount of disc drive compatible lubricant that is effective in providing a layer of predetermined thickness between about 200 Å and about 500 Å.

In another preferred embodiment of the invention, the method further includes using an amount of disc drive compatible lubricant that is effective in providing a layer of predetermined thickness between about 200 Å and about 350 Å.

In another preferred embodiment of the invention, the method further includes using an amount of disc drive compatible lubricant that is effective in providing a layer of predetermined thickness between about 200 Å and about 250 Å.

In another preferred embodiment of the invention, the method further includes a liquid crystal polymer as the polymer melt.

Another preferred embodiment of the invention described herein is directed to a second method for fabricating a load/unload ramp (such as 120) for a disc drive (such as 100). The method includes providing a mold (such as 158) having a load/unload ramp shaped cavity (such as 160) (such as in step 600) and of plasticizing a polymer to form a polymer melt (such as in step 602). Next, the polymer melt and a disc drive compatible lubricant are mixed such that the disc drive compatible lubricant is effective in providing a layer (such as 156) of predetermined thickness on the fabricated load/unload ramp (such as in step 604). The mixture is then injected into the mold cavity (such as in step 606). Finally, the mixture is allowed to solidify in the cavity (such as in step 608) and the fabricated load/unload ramp is released from the cavity (such as in step 610).

In another preferred embodiment of the invention, the method further includes selecting perfluoropolyether as the disc drive compatible lubricant.

In another preferred embodiment of the invention, the method further includes using an amount of disc drive compatible lubricant that when mixed with the polymer melt is effective in providing a lubricant layer of predetermined thickness between 200 Å and 500 Å.

In another preferred embodiment of the invention, the method further includes using an amount of disc drive compatible lubricant that when mixed with the polymer melt is effective in providing a lubricant layer of predetermined thickness between 200 Å and 350 Å.

In another preferred embodiment of the invention, the method further includes using an amount of disc drive compatible lubricant that when mixed with the polymer melt is effective in providing a lubricant layer of predetermined thickness between 200 Å and 250 Å.

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method of fabricating a load/unload ramp for a disc drive, the method comprising:
    (a) providing a load/unload ramp composition comprising a polymer and a lubricant selected from perfluororpolyether and derivatives thereof; and
    (b) injecting the composition into a mold to form a load/unload ramp, wherein the amount of lubricant in the composition is sufficient to provide a layer of lubricant on a surface of the ramp with a thickness of between about 200 Å and about 500 Å.

2. The method according to claim 1 wherein the perfluoropolyether derivative is selected from the group consisting of 2-Tetraol and 2-Dol.

3. The method according to claim 1 wherein the amount of lubricant in the composition is sufficient to provide a layer with a thickness between about 200 Å and about 350 Å.

4. The method according to claim 1 wherein the amount of lubricant in the composition is sufficient to provide a layer with a thickness between about 200 Å and about 250 Å.

5. The method according to claim 1 wherein the amount of lubricant in the composition is 0.5% to 3%.

6. The method according to claim 1 wherein the composition further comprises a surfactant.

7. The method according to claim 1 wherein the lubricant is perfluoropolyether.

* * * * *